US010094320B2

(12) United States Patent
Sanborn et al.

(10) Patent No.: US 10,094,320 B2
(45) Date of Patent: Oct. 9, 2018

(54) METHODS AND SYSTEMS FOR DUAL FUEL INJECTION

(71) Applicant: Ford Global Technologies, LLC, Dearborn, MI (US)

(72) Inventors: Ethan D. Sanborn, Saline, MI (US); Paul Hollar, Belleville, MI (US); Daniel Dusa, West Bloomfield, MI (US); Joseph Lyle Thomas, Kimball, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/133,739

(22) Filed: Apr. 20, 2016

(65) Prior Publication Data

US 2016/0377018 A1 Dec. 29, 2016

Related U.S. Application Data

(60) Provisional application No. 62/183,465, filed on Jun. 23, 2015.

(51) Int. Cl.
| | |
|---|---|
| *F02D 41/38* | (2006.01) |
| *F02D 41/34* | (2006.01) |
| *F02M 63/02* | (2006.01) |
| *F02D 41/10* | (2006.01) |

(Continued)

(52) U.S. Cl.
CPC ......... *F02D 41/345* (2013.01); *F02D 41/105* (2013.01); *F02D 41/3094* (2013.01); *F02M 63/029* (2013.01); *F02M 63/0285* (2013.01); *F02D 2041/3881* (2013.01); *F02D 2200/0602* (2013.01); *F02D 2250/04* (2013.01); *F02M 37/0041* (2013.01); *Y02T 10/44* (2013.01)

(58) Field of Classification Search
CPC .......... F02D 2041/3881; F02D 41/105; F02D 41/3094; F02D 41/345; F02D 2250/04; F02D 19/0692; F02M 37/0041; F02M 63/0285

See application file for complete search history.

(56) References Cited

U.S. PATENT DOCUMENTS 4,457,283 A * 7/1984 Kobayashi ............ F02D 41/182
123/492
4,485,791 A * 12/1984 Sugo ................... F02D 41/0087
123/472

(Continued)

OTHER PUBLICATIONS

Sanborn, Ethan D., "Methods and Systems for Dual Fuel Injection," U.S. Appl. No. 15/098,144, filed Apr. 13, 2016, 48 pages.

*Primary Examiner* — Sizo Vilakazi
*Assistant Examiner* — Kevin R Steckbauer
(74) *Attorney, Agent, or Firm* — Julia Voutyras McCoy Russell LLP

(57) ABSTRACT

Methods and systems are provided for reducing fueling errors resulting from pressure pulsations in a port injection fuel rail. The pressure pulsations result from pressure pulsations generated in a high pressure fuel pump delivering fuel to both the port injection fuel rail and a direct injection fuel rail. A center of a port injection fuel pulse is repositioned on a nearest fuel rail pressure sampling point in the advanced direction to improve the accuracy of the delivered fuel pulse.

19 Claims, 5 Drawing Sheets

(51) Int. Cl.
*F02D 41/30* (2006.01)
*F02M 37/00* (2006.01)

(56) References Cited

U.S. PATENT DOCUMENTS

| | | | | |
|---|---|---|---|---|
| 4,532,902 A * | 8/1985 | Mizuno | ............... | F02P 5/06 123/406.47 |
| 4,543,937 A * | 10/1985 | Amano | ............... | F02D 41/061 123/491 |
| 4,607,603 A * | 8/1986 | Kobayashi | ............... | F02D 41/045 123/492 |
| 4,841,937 A * | 6/1989 | Nagaishi | ............... | F02B 77/08 123/492 |
| 5,390,641 A * | 2/1995 | Yamada | ............... | F02D 41/062 123/480 |
| 5,954,025 A * | 9/1999 | Kanamaru | ............... | F02D 41/06 123/179.16 |
| 6,349,702 B1 * | 2/2002 | Nishiyama | ............... | F02D 41/3836 123/447 |
| 6,550,457 B1 * | 4/2003 | Kitagawa | ............... | F02D 41/105 123/486 |
| 6,694,953 B2 * | 2/2004 | Barnes | ............... | F02D 41/2422 123/357 |
| 6,705,295 B1 * | 3/2004 | Tarroux | ............... | F02D 41/3836 123/488 |
| 7,188,608 B2 * | 3/2007 | Wilson | ............... | F02D 41/064 123/456 |
| 7,370,638 B2 * | 5/2008 | Hayakawa | ............... | F02D 41/221 123/467 |
| 7,418,337 B2 * | 8/2008 | Toyohara | ............... | F02D 41/3836 123/478 |
| 7,500,471 B2 * | 3/2009 | Adachi | ............... | F02D 31/007 123/436 |
| 7,610,141 B2 * | 10/2009 | Toyohara | ............... | F02D 41/3836 123/446 |
| 7,775,102 B2 * | 8/2010 | Haerer | ............... | F02D 41/38 417/225 |
| 8,700,407 B2 | 4/2014 | Wang et al. | | |
| 8,955,490 B2 * | 2/2015 | Sahashi | ............... | F02D 41/222 123/198 D |
| 9,765,725 B2 * | 9/2017 | Nieddu | ............... | F02D 41/3809 |
| 2003/0062028 A1 * | 4/2003 | Kitagawa | ............... | F02D 41/105 123/486 |
| 2003/0106534 A1 * | 6/2003 | Wilson | ............... | F02D 41/064 123/456 |
| 2003/0121501 A1 * | 7/2003 | Barnes | ............... | F02D 41/2422 123/446 |
| 2007/0125343 A1 * | 6/2007 | Hayakawa | ............... | F02D 41/221 123/447 |
| 2007/0243077 A1 * | 10/2007 | Haerer | ............... | F02D 41/22 417/225 |
| 2008/0035118 A1 * | 2/2008 | Toyohara | ............... | F02D 41/3836 123/478 |
| 2008/0060617 A1 * | 3/2008 | Adachi | ............... | F02D 31/007 123/447 |
| 2008/0270007 A1 * | 10/2008 | Toyohara | ............... | F02D 41/3836 701/103 |
| 2011/0097228 A1 * | 4/2011 | Tokuo | ............... | F02M 37/0047 417/505 |
| 2013/0125862 A1 * | 5/2013 | Sahashi | ............... | F02D 41/222 123/447 |
| 2013/0247874 A1 * | 9/2013 | Saito | ............... | F02D 41/3854 123/446 |
| 2015/0040852 A1 | 2/2015 | Pursifull | | |
| 2015/0233317 A1 * | 8/2015 | Kawabe | ............... | F02D 41/3094 123/491 |
| 2015/0233318 A1 * | 8/2015 | Nieddu | ............... | F02D 41/123 701/104 |
| 2016/0363104 A1 * | 12/2016 | Sanborn | ............... | F02M 37/0041 |
| 2017/0167450 A1 * | 6/2017 | Spakowski | ............... | F02M 31/20 |
| 2017/0211501 A1 * | 7/2017 | Tachibana | ............... | F02D 41/3094 |
| 2017/0211502 A1 * | 7/2017 | Tachibana | ............... | F02D 41/32 |
| 2017/0211503 A1 * | 7/2017 | Tachibana | ............... | F02D 41/34 |

* cited by examiner

METHODS AND SYSTEMS FOR DUAL FUEL INJECTION

CROSS REFERENCE TO RELATED APPLICATION

The present application claims priority to U.S. Provisional Patent Application No. 62/183,465, entitled "Methods and Systems for Dual Fuel Injection," filed on Jun. 23, 2015, the entire contents of which are hereby incorporated by reference for all purposes.

FIELD

The present description relates to systems and methods for adjusting operation of an internal combustion engine that includes high pressure port and direct fuel injectors.

BACKGROUND AND SUMMARY

Direct fuel injection (DI) systems provide some advantages over port fuel injection systems. For example, direct fuel injection systems may improve cylinder charge cooling so that engine cylinders may operate at higher compression ratios without incurring undesirable engine knock. However, direct fuel injectors may not be able to provide a desired amount of fuel to a cylinder at higher engine speeds and loads because the amount of time a cylinder stroke takes is shortened so that there may not be sufficient time to inject a desired amount of fuel. Consequently, the engine may develop less power than is desired at higher engine speeds and loads. In addition, direct injection systems may be more prone to particulate matter emissions.

In an effort to reduce the particulate matter emissions and fuel dilution in oil, very high pressure direct injection systems have been developed. For example, while nominal direct injection maximum pressures are in the range of 150 bar, the higher pressure DI systems may operate in the range of 250-800 bar using a high pressure piston pump that is mechanically driven by the engine via a camshaft. In engines configured with dual injection systems, that is engines enabled with both direct and port fuel injectors, pressurized fuel from the fuel tank may be supplied to both the direct injection high pressure fuel pump (HPFP) as well as the port injection fuel rail. In order to reduce hardware complexity, the fuel may be supplied to the port injection fuel rail either through the HPFP, or may be branched off before the pump, thereby reducing the need for a dedicated pump for the port injection fuel rail.

However, one issue with such dual fuel injection system configurations is that fuel pulsations from the high pressure fuel pump may enter the port injection fuel rail. This is due to the sinusoidal fuel pressure generated at the high pressure fuel pump due to the pump being driven by the engine via a camshaft (and cam lobes). The pulsations may worsen when the HPFP is not flowing any fuel into the direct injection fuel rail (such as when direct injection is disabled) due to the pump returning all of the ingested volume back into the low pressure region of the fuel system. The pulsations in the port injection fuel rail can lead to larger discrepancies between the value of rested fuel in the port injection fuel rail as compared to value of fuel injected from the port injection fuel rail. As such, this can result in large fueling errors.

In one example, the above issue may be at least partly addressed by a method for an engine, comprising: pressurizing fuel in a port injection fuel rail via an engine camshaft-driven high pressure fuel pump; intermittently sampling fuel pressure in the port injection fuel rail; and during conditions when a port injection fuel pulse is smaller than a threshold, moving the port injection fuel pulse from an initial timing, asynchronous with the intermittent sampling, to a final timing, synchronous with the intermittent sampling. In this way, fueling errors due to fuel pump induced pressure fluctuations in the port injection fuel rail are reduced.

As one example, an engine system may include an engine-driven high pressure fuel pump supplying fuel to each of a port and direct injection fuel rail. The fuel pump may be a piston pump coupled to the engine via each of a camshaft and cam lobes, and due to this configuration, the fuel pressure in the fuel pump may vary in a sinusoidal manner. This may in turn cause sinusoidal fluctuations in a fuel pressure in the port injection fuel rail. An engine controller may intermittently sample the pressure in the port injection fuel rail, for example, based on engine firing frequency. Based on a first sampling of the port injection fuel rail pressure, an initial timing and width of a port fuel injection pulse may be determined. For example, based on engine operating conditions such as intake valve opening (IVO) and fuel flow velocity through the fuel system, the fuel pulse timing may be adjusted to allow for a closed intake valve injection. If the pulse width is small enough, to reduce fueling errors, the timing of the port injection fuel pulse may then be advanced to coincide with the timing of a second sampling of the port injection fuel rail pressure, the second sampling following the first sampling with no intermediate fuel pressure sampling. In addition, the initial pulse width of the port injection fuel pulse may be adjusted based on the advanced timing to compensate for any differences in fuel puddle dynamics.

The technical effect of moving a port fuel injection pulse that is asynchronous with fuel rail pressure sampling, to a timing that is synchronous with fuel rail pressure sampling is that the effect of fueling errors can be taken away. Specifically, by centering the fuel pulse around a fuel rail pressure sampling point, variations between fuel rail pressure at the time of fuel pulse commanding and the time of fuel pulse delivery can be better accounted for, reducing fueling errors. As such, this provides for more accurate fuel metering for relatively small fuel pulses. Overall, metering of fuel from the port injection fuel rail is improved while removing the need for a dedicated fuel line for the port injection fuel system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
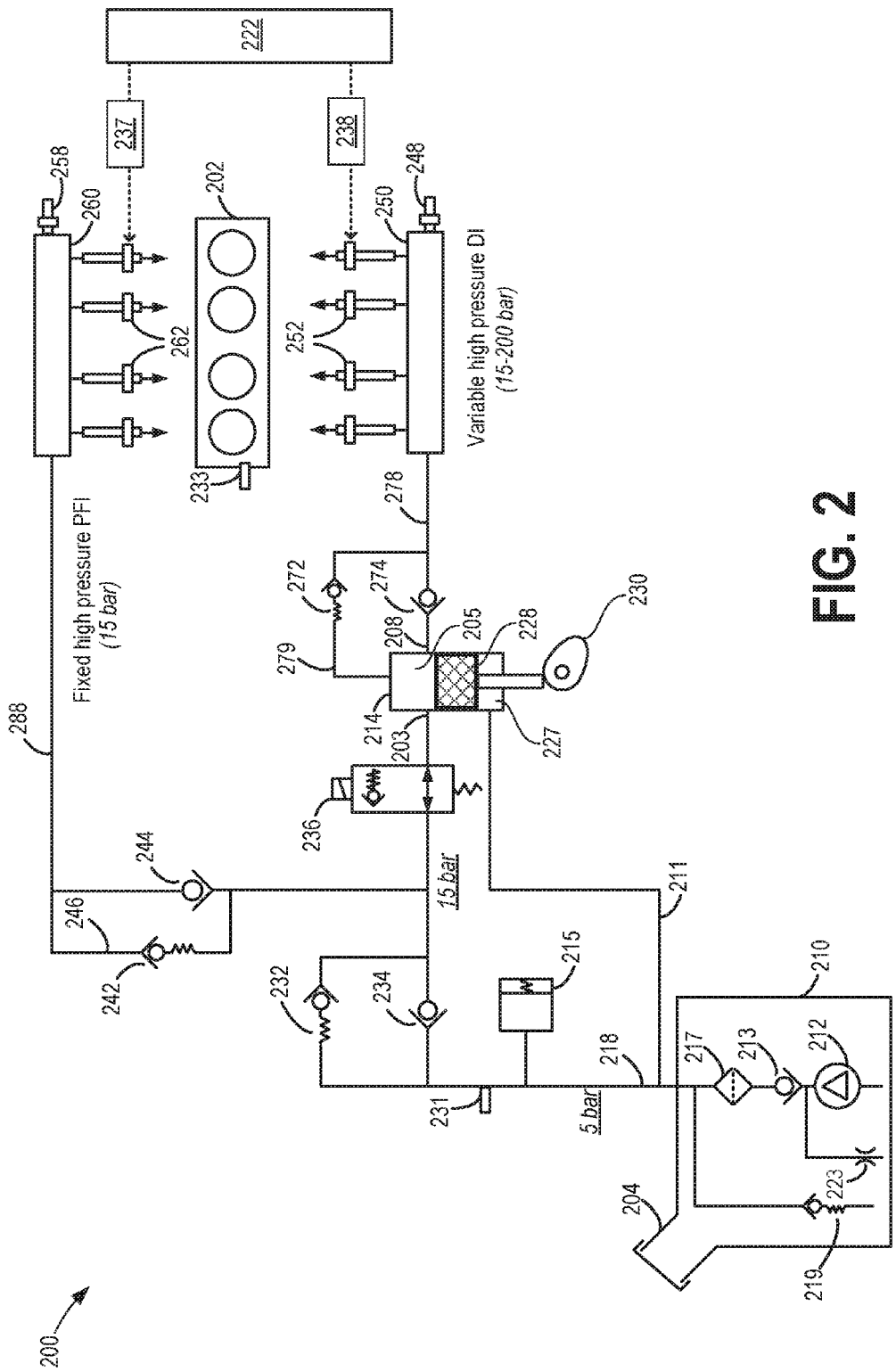
FIG. 2 schematically depicts an example embodiment of a fuel system configured for high pressure port injection and high pressure direct injection that may be used with the engine of FIG. 1.
Figure 3:
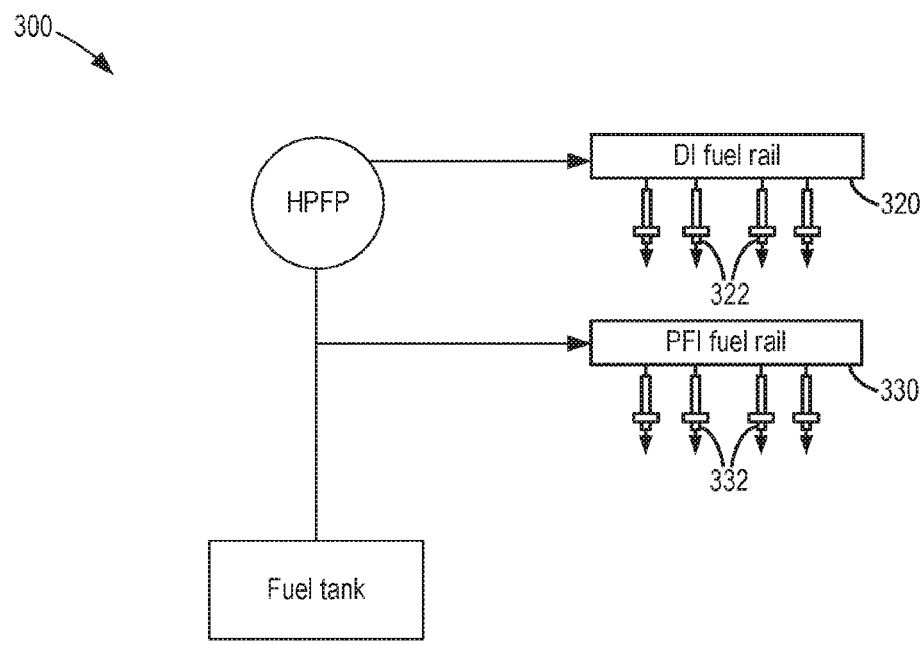
FIG. 3 depicts alternate embodiments of a dual fuel injection system that may be used with the engine of FIG. 1.
Figure 3:
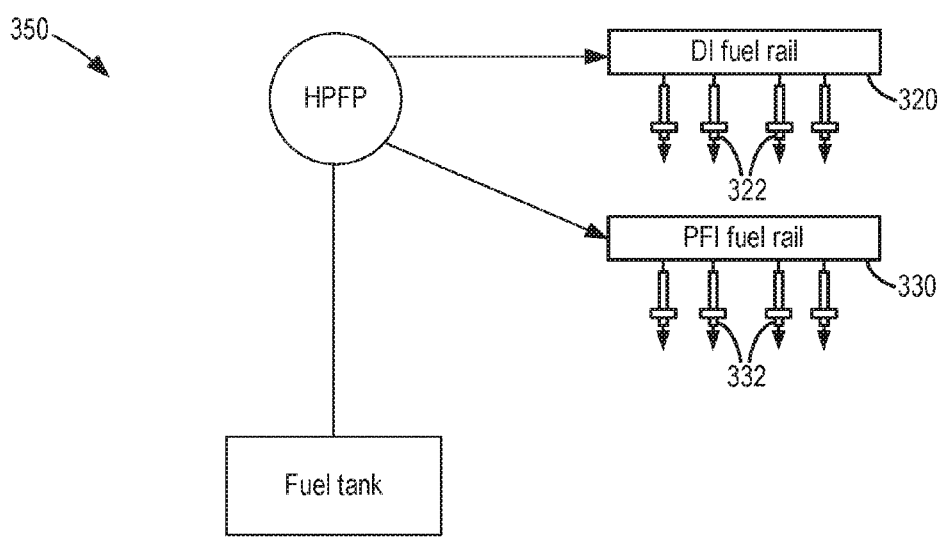
Figure 4:
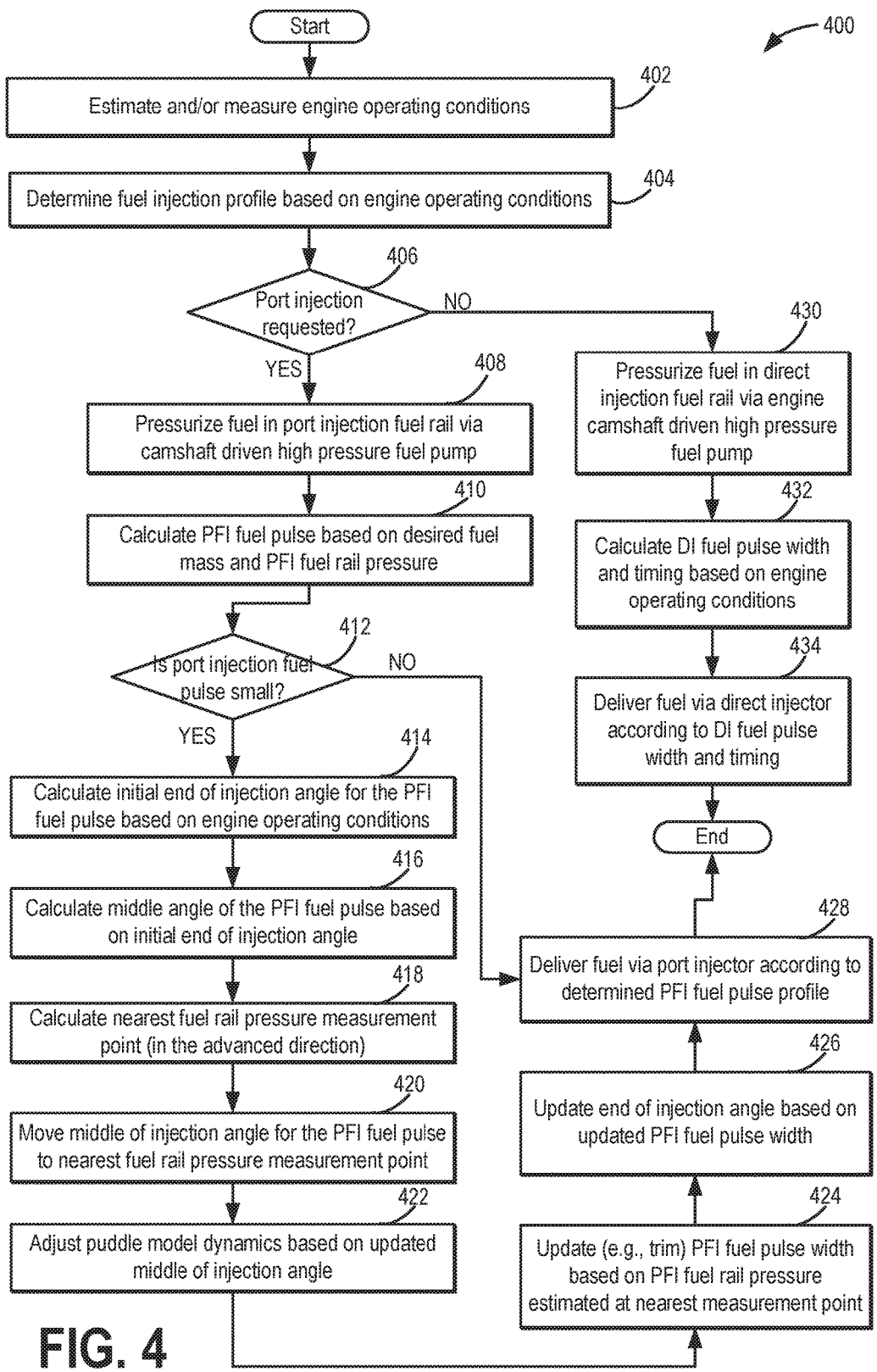
FIG. 4 shows a flow chart of a method for adjusting a timing of a port fuel injection pulse based on a port injection fuel pulse commanding and/or measurement point.
Figure 5:
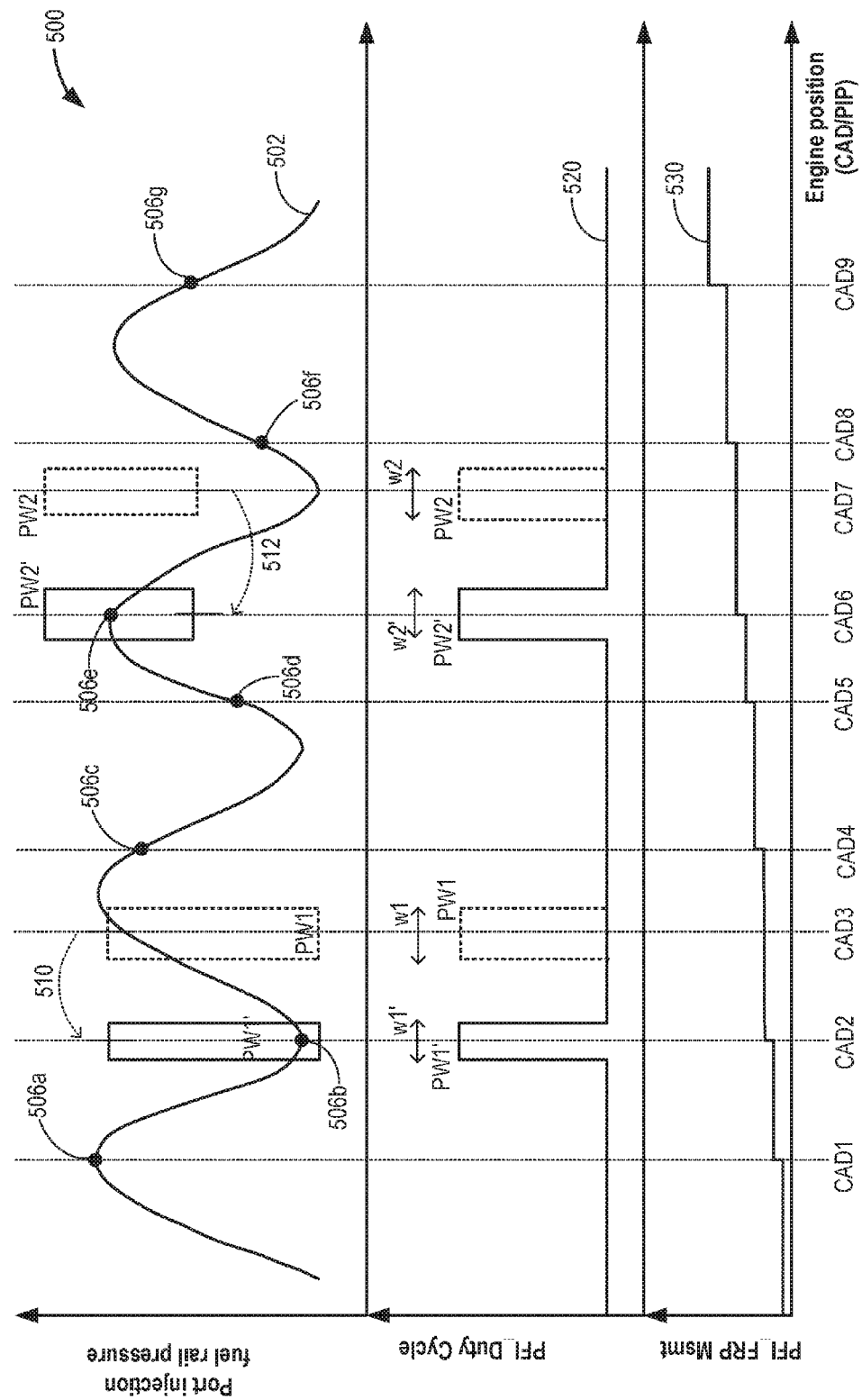
FIG. 5 shows an example of fuel injection pulse placement in alignment with a fuel pulse scheduling and/or measuring point.

The following detailed description provides information regarding a high pressure fuel pump and a system for reducing high pressure pump-induced pressure fluctuations at a port injection fuel rail. An example embodiment of a cylinder in an internal combustion engine is given in FIG. 1 while FIGS. 2-3 depict example fuel systems that may be used with the engine of FIG. 1. A controller may be configured to perform a control routine, such as the example routine of FIG. 4, to reposition a port injection fuel pulse so as to align a center of the fuel pulse with a port injection fuel rail pressure sampling point. An example repositioning of a port fuel injection pulse is shown at FIG. 5.

Regarding terminology used throughout this detailed description, a high pressure pump, or direct injection pump, may be abbreviated as a DI or HP pump. Similarly, a low pressure pump, or lift pump, may be abbreviated as a LP pump. Port fuel injection may be abbreviated as PFI while direct injection may be abbreviated as DI. Also, fuel rail pressure, or the value of pressure of fuel within a fuel rail, may be abbreviated as FRP. Also, the mechanically operated inlet check valve for controlling fuel flow into the HP pump may also be referred to as the spill valve. As discussed in more detail below, an HP pump that relies on mechanical pressure regulation without use of an electronically-controlled inlet valve may be referred to as a mechanically-controlled HP pump, or HP pump with mechanically-regulated pressure. Mechanically-controlled HP pumps, while not using electronically-controlled inlet valves for regulating a volume of fuel pumped, may provide one or more discrete pressures based on electronic selection.

Figure 1:
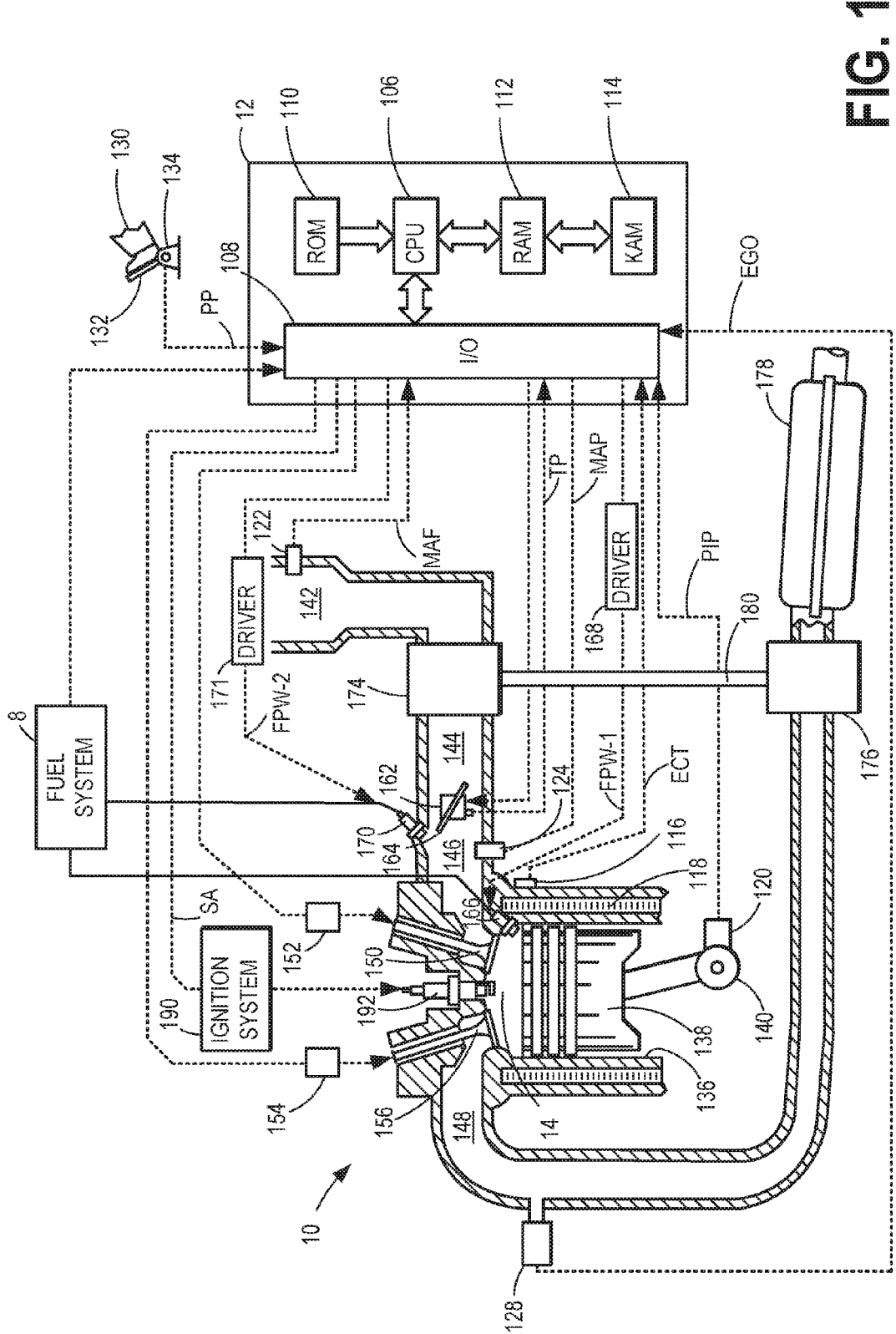
FIG. 1 schematically depicts an example embodiment of a cylinder of an internal combustion engine.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIGS. 2 and 3, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 (and FIG. 2) and employs the various actuators of FIG. 1 (and FIG. 2) to adjust engine operation based on the received signals and instructions stored on a memory of the controller FIG. 2 schematically depicts an example embodiment 200 of a fuel system, such as fuel system 8 of FIG. 1. Fuel system 200 may be operated to deliver fuel to an engine, such as engine 10 of FIG. 1. Fuel system 200 may be operated by a controller to perform some or all of the operations described with reference to the process flows of FIGS. 4 and 6.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via a fuel filling passage 204. In one example, LPP 212 may be an electrically-powered lower pressure fuel pump disposed at least partially within fuel tank 210. LPP 212 may be operated by a controller 222 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the lift pump 212. This bleed at 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group). Fuel lifted by the LPP 212 may also be supplied to a second fuel rail 260 coupled to one or more fuel injectors of a second group of port injectors 262 (herein also referred to as a second injector group). As elaborated below, HPP 214 may be operated to raise the pressure of fuel delivered to each of the first and second fuel rail above the lift pump pressure, with the first fuel rail coupled to the direct injector group operating with a variable high pressure while the second fuel rail coupled to the port injector group operates with a fixed high pressure. As a result, high pressure port and direct injection may be enabled. The high pressure fuel pump is coupled downstream of the low pressure lift pump with no additional pump positioned in between the high pressure fuel pump and the low pressure lift pump.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 for each cylinder of the engine while second fuel rail 260 may dispense fuel to one fuel injector of second injector group 262 for each cylinder of the engine. Controller 222 can individually actuate each of the port injectors 262 via a port injection driver 237 and actuate each of the direct injectors 252 via a direct injection driver 238. The controller 222, the drivers 237, 238 and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

HPP 214 may be an engine-driven, positive-displacement pump. As one non-limiting example, HPP 214 may be a BOSCH HDP5 HIGH PRESSURE PUMP, which utilizes a solenoid activated control valve (e.g., fuel volume regulator, magnetic solenoid valve, etc.) 236 to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222.

Fuel system 200 may optionally further include accumulator 215. When included, accumulator 215 may be positioned downstream of lower pressure fuel pump 212 and upstream of higher pressure fuel pump 214, and may be configured to hold a volume of fuel that reduces the rate of fuel pressure increase or decrease between fuel pumps 212 and 214. For example, accumulator 215 may be coupled in fuel passage 218, as shown, or in a bypass passage 211 coupling fuel passage 218 to the step-room 227 of HPP 214. The volume of accumulator 215 may be sized such that the engine can operate at idle conditions for a predetermined period of time between operating intervals of lower pressure fuel pump 212. For example, accumulator 215 can be sized such that when the engine idles, it takes one or more minutes to deplete pressure in the accumulator to a level at which higher pressure fuel pump 214 is incapable of maintaining a sufficiently high fuel pressure for fuel injectors 252, 262. Accumulator 215 may thus enable an intermittent operation mode (or pulsed mode) of lower pressure fuel pump 212. By reducing the frequency of LPP operation, power consumption is reduced. In other embodiments, accumulator 215 may inherently exist in the compliance of fuel filter 217 and fuel passage 218, and thus may not exist as a distinct element.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212. While lift pump fuel pressure sensor 231 is shown as being positioned downstream of accumulator 215, in other embodiments the sensor may be positioned upstream of the accumulator.

First fuel rail 250 includes a first fuel rail pressure sensor 248 for providing an indication of direct injection fuel rail pressure to the controller 222. Likewise, second fuel rail 260 includes a second fuel rail pressure sensor 258 for providing an indication of port injection fuel rail pressure to the controller 222. An engine speed sensor 233 can be used to provide an indication of engine speed to the controller 222. The indication of engine speed can be used to identify the speed of higher pressure fuel pump 214, since the pump 214 is mechanically driven by the engine 202, for example, via the crankshaft or camshaft.

First fuel rail 250 is coupled to an outlet 208 of HPP 214 along fuel passage 278. In comparison, second fuel rail 260 is coupled to an inlet 203 of HPP 214 via fuel passage 288. A check valve and a pressure relief valve may be positioned between the outlet 208 of the HPP 214 and the first fuel rail. In addition, pressure relief valve 272, arranged parallel to check valve 274 in bypass passage 279, may limit the pressure in fuel passage 278, downstream of HPP 214 and upstream of first fuel rail 250. For example, pressure relief valve 272 may limit the pressure in fuel passage 278 to 200 bar. As such, pressure relief valve 272 may limit the pressure that would otherwise be generated in fuel passage 278 if control valve 236 were (intentionally or unintentionally) open and while high pressure fuel pump 214 were pumping.

One or more check valves and pressure relief valves may also be coupled to fuel passage 218, downstream of LPP 212 and upstream of HPP 214. For example, check valve 234 may be provided in fuel passage 218 to reduce or prevent back-flow of fuel from high pressure pump 214 to low pressure pump 212 and fuel tank 210. In addition, pressure relief valve 232 may be provided in a bypass passage, positioned parallel to check valve 234. Pressure relief valve 232 may limit the pressure to its left to 10 bar higher than the pressure at sensor 231.

Controller 222 may be configured to regulate fuel flow into HPP 214 through control valve 236 by energizing or de-energizing the solenoid valve (based on the solenoid valve configuration) in synchronism with the driving cam. Accordingly, the solenoid activated control valve 236 may be operated in a first mode where the valve 236 is positioned within HPP inlet 203 to limit (e.g., inhibit) the amount of fuel traveling through the solenoid activated control valve 236. Depending on the timing of the solenoid valve actuation, the volume transferred to the fuel rail 250 is varied. The solenoid valve may also be operated in a second mode where the solenoid activated control valve 236 is effectively disabled and fuel can travel upstream and downstream of the valve, and in and out of HPP 214.

As such, solenoid activated control valve 236 may be configured to regulate the mass (or volume) of fuel compressed into the direct injection fuel pump. In one example, controller 222 may adjust a closing timing of the solenoid pressure control check valve to regulate the mass of fuel compressed. For example, a late pressure control valve closing may reduce the amount of fuel mass ingested into compression chamber 205. The solenoid activated check valve opening and closing timings may be coordinated with respect to stroke timings of the direct injection fuel pump.

Pressure relief valve 232 allows fuel flow out of solenoid activated control valve 236 toward the LPP 212 when pressure between pressure relief valve 232 and solenoid operated control valve 236 is greater than a predetermined pressure (e.g., 10 bar). When solenoid operated control valve 236 is deactivated (e.g., not electrically energized), solenoid operated control valve operates in a pass-through mode and pressure relief valve 232 regulates pressure in compression chamber 205 to the single pressure relief set-point of pressure relief valve 232 (e.g., 10 bar above the pressure at sensor 231). Regulating the pressure in compression chamber 205 allows a pressure differential to form from the piston top to the piston bottom. The pressure in step-room 227 is at the pressure of the outlet of the low pressure pump (e.g., 5 bar) while the pressure at piston top is at pressure relief valve regulation pressure (e.g., 15 bar). The pressure differential allows fuel to seep from the piston top to the piston bottom through the clearance between the piston and the pump cylinder wall, thereby lubricating HPP 214.

Piston 228 reciprocates up and down. HPP 214 is in a compression stroke when piston 228 is traveling in a direction that reduces the volume of compression chamber 205. HPP 214 is in a suction stroke when piston 228 is traveling in a direction that increases the volume of compression chamber 205.

A forward flow outlet check valve 274 may be coupled downstream of an outlet 208 of the compression chamber 205. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. Thus, during conditions when direct injection fuel pump operation is not requested, controller 222 may deactivate solenoid activated control valve 236 and pressure relief valve 232 regulates pressure in compression chamber 205 to a single substantially constant pressure during most of the compression stroke. On the intake stroke the pressure in compression chamber 205 drops to a pressure near the pressure of the lift pump (212). Lubrication of DI pump 214 may occur when the pressure in compression chamber 205 exceeds the pressure in step-room 227. This difference in pressures may also contribute to pump lubrication when controller 222 deactivates solenoid activated control valve 236. One result of this regulation method is that the fuel rail is regulated to a minimum pressure, approximately the pressure relief of pressure relief valve 232. Thus, if pressure relief valve 232 has a pressure relief setting of 10 bar, the fuel rail pressure becomes 15 bar because this 10 bar adds to the 5 bar of lift pump pressure. Specifically, the fuel pressure in compression chamber 205 is regulated during the compression stroke of direct injection fuel pump 214. Thus, during at least the compression stroke of direct injection fuel pump 214, lubrication is provided to the pump. When direct fuel injection pump enters a suction stroke, fuel pressure in the compression chamber may be reduced while still some level of lubrication may be provided as long as the pressure differential remains. Another pressure relief valve 272 may be placed in parallel with check valve 274. Pressure relief valve 272 allows fuel flow out of the DI fuel rail 250 toward pump outlet 208 when the fuel rail pressure is greater than a predetermined pressure.

As such, while the direct injection fuel pump is reciprocating, the flow of fuel between the piston and bore ensures sufficient pump lubrication and cooling.

The lift pump may be transiently operated in a pulsed mode where the lift pump operation is adjusted based on a pressure estimated at the outlet of the lift pump and inlet of the high pressure pump. In particular, responsive to high pressure pump inlet pressure falling below a fuel vapor pressure, the lift pump may be operated until the inlet pressure is at or above the fuel vapor pressure. This reduces the risk of the high pressure fuel pump ingesting fuel vapors (instead of fuel) and ensuing engine stall events.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Solenoid activated control valve 236 may also be operated to direct fuel back-flow from the high pressure pump to one of pressure relief valve 232 and accumulator 215. For example, control valve 236 may be operated to generate and store fuel pressure in accumulator 215 for later use. One use of accumulator 215 is to absorb fuel volume flow that results from the opening of compression pressure relief valve 232. Accumulator 227 sources fuel as check valve 234 opens during the intake stroke of pump 214. Another use of accumulator 215 is to absorb/source the volume changes in the step room 227. Yet another use of accumulator 215 is to allow intermittent operation of lift pump 212 to gain an average pump input power reduction over continuous operation.

While the first direct injection fuel rail 250 is coupled to the outlet 208 of HPP 214 (and not to the inlet of HPP 214), second port injection fuel rail 260 is coupled to the inlet 203 of HPP 214 (and not to the outlet of HPP 214). Although inlets, outlets, and the like relative to compression chamber 205 are described herein, it may be appreciated that there may be a single conduit into compression chamber 205. The single conduit may serve as inlet and outlet. In particular, second fuel rail 260 is coupled to HPP inlet 203 at a location upstream of solenoid activated control valve 236 and downstream of check valve 234 and pressure relief valve 232. Further, no additional pump may be required between lift pump 212 and the port injection fuel rail 260. As elaborated below, the specific configuration of the fuel system with the port injection fuel rail coupled to the inlet of the high pressure pump via a pressure relief valve and a check valve enables the pressure at the second fuel rail to be raised via the high pressure pump to a fixed default pressure that is above the default pressure of the lift pump. That is, the fixed high pressure at the port injection fuel rail is derived from the high pressure piston pump.

When the high pressure pump 214 is not reciprocating, such as at key-up before cranking, check valve 244 allows the second fuel rail to fill at 5 bar. As the pump chamber displacement becomes smaller due to the piston moving upward, the fuel flows in one of two directions. If the spill valve 236 is closed, the fuel goes into the high pressure fuel rail 250. If the spill valve 236 is open, the fuel goes either into the low pressure fuel rail 250 or through the compression relief valve 232. In this way, the high pressure fuel pump is operated to deliver fuel at a variable high pressure (such as between 15-200 bar) to the direct fuel injectors 252 via the first fuel rail 250 while also delivering fuel at a fixed high pressure (such as at 15 bar) to the port fuel injectors 262 via the second fuel rail 260. The variable pressure may include a minimum pressure that is at the fixed pressure (as in the system of FIG. 2). In the configuration depicted at FIG. 2, the fixed pressure of the port injection fuel rail is the same as the minimum pressure for the direct injection fuel rail, both being higher than the default pressure of the lift pump. Herein, the fuel delivery from the high pressure pump is controlled via the upstream (solenoid activated) control valve and further via the various check valve and pressure relief valves coupled to the inlet of the high pressure pump. By adjusting operation of the solenoid activated control valve, the fuel pressure at the first fuel rail is raised from the fixed pressure to the variable pressure while maintaining the fixed pressure at the second fuel rail. Valves 244 and 242 work in conjunction to keep the low pressure fuel rail 260 pressurized to 15 bar during the pump inlet stroke. Pressure relief valve 242 simply limits the pressure that can build in fuel rail 250 due to thermal expansion of fuel. A typical pressure relief setting may be 20 bar.

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 222 may be used to send a control signal to the low pressure pump, as required, to adjust the output (e.g. speed) of the low pressure pump.

The embodiment depicted at FIG. 2, and also at embodiment 300 of FIG. 3, show a first fuel system configuration wherein fuel is supplied to the port injection fuel rail from the fuel tank by branching off before the high pressure direct injection fuel pump (HPFP). It will be appreciated, however, that in alternate embodiments, such as shown at embodiment 350 of FIG. 3, fuel may be supplied to the port injection fuel rail from the fuel tank via the high pressure direct injection fuel pump. Specifically, the high pressure fuel pump of embodiment 350 in FIG. 3 has one inlet (low fuel pressure from the lift pump) and two outlets (high fuel pressure to the DI rail and low fuel pressure to the PFI rail). The high pressure fuel pump does not pressurize any of the fuel being directed to the PFI rail. The low pressure fuel flowing through the pump helps cool and protect the high pressure pump. In earlier engine fuel system configurations (e.g., prior art), a dedicated low pressure pump was used for pressurizing the port injection fuel rail, the low pressure pump distinct from the high pressure pump used for pressurizing the direct injection fuel rail. The present configurations, depicted at FIGS. 2-3, allow for hardware reduction by using the same pump to pressurize both fuel rails. However in both configurations, fuel flow through the HPFP can cause fuel pulsations to enter the port injection fuel rail. This is due to the high pressure piston pump being driven by an engine camshaft, resulting in a defined number of pulses being experienced at the HPFP, and thereby in the port injection fuel rail, on each engine rotation (e.g., 3 pulses every 270 degrees on a 4-cylinder in-line engine). The port injection fuel rail pulsations may be exacerbated during conditions when the high pressure fuel pump is not supplying fuel to the direct injection fuel rail (such as when no direct injection of fuel is requested) and when fuel is only being supplied to the port injection fuel rail (such as when only port injection of fuel is requested). This is due to the direct injection fuel rail returning all of the ingested volume of fuel back to the lower pressure system. These pulsations in the port injection fuel rail can lead to significant fueling errors.

As elaborated herein, the fueling errors may be reduced by adjusting the timing of a port injection fuel pulse. The delivery of the port injection pulse may be moved to coincide with a first fuel rail pressure sampling point in an advanced direction (as shown at FIGS. 4-5). In this way, fueling errors due to fuel pressure excursions are reduced, improving port fuel injection metering. At the same time, closed intake valve port fuel injection can be maintained.

Turning now to method 400, an example method is shown for pressurizing fuel in a port injection fuel rail via an engine camshaft driven high pressure fuel pump, intermittently sampling the fuel pressure in a port injection fuel rail, and selectively injecting a port fuel injection with a timing balanced around a closest fuel rail pressure sampling point in the advanced direction. Instructions for carrying out method 400 and the rest of the methods included herein may be executed by a controller based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

At 402, the method includes estimating and/or measuring engine operating conditions. The parameters may include, for example, engine speed, driver torque demand, fuel rail pressure, engine temperature, ambient conditions, etc. At 404, the method includes determining a fuel injection profile based on the estimated engine operating conditions. The determined fuel injection profile may include an amount of fuel to be delivered via port injection (a port injection fuel pulse) and an amount of fuel to be delivered via direct injection (a direct injection fuel pulse). As an example, a desired fuel mass may be determined based on driver demand. Based on the desired fuel mass (for port and direct injection), and further based on fuel rail pressure, corresponding fuel pulses (for port and direct injection) may be calculated.

At 406, it may be confirmed that port injection was requested. If at least some port injection was requested, the method proceeds to 408. If no port injection is requested, and only direct injection (DI) is requested, the method moves to 430. Therein, only the direct injection fuel rail is pressurized via a high pressure fuel pump that is coupled to the engine and driven via the engine camshaft. Specifically, an output of the high pressure fuel pump is adjusted to provide the desired fuel rail pressure at the direct injection fuel rail. At 432, the method further includes calculating a DI fuel pulse width and timing based on the desired DI fuel mass. At 434, the method includes delivering the desired DI fuel mass by operating the high pressure fuel pump and injecting fuel via the direct injector with the determined DI fuel pulse width and timing.

If at least some port fuel injection (PFI) was requested at 406, the routine includes pressurizing fuel in the port injection fuel rail via the camshaft-driven high pressure fuel pump. This includes conditions where only port fuel injection is requested as well as conditions where port and direct fuel injection are both requested. Specifically, an output of the high pressure fuel pump is adjusted to provide the desired fuel rail pressure at the port injection fuel rail. At 410, a PFI fuel injection pulse width is calculated based on engine operating conditions, such as desired fuel mass and PFI fuel rail pressure. In one example, the port injection fuel rail pressure may be estimated by a pressure sensor coupled to the PFI fuel rail, the port injection fuel rail pressure intermittently sampled by the pressure sensor with a frequency based on engine firing frequency. For example, for a 6 cylinder V-configuration engine, the port injection fuel rail pressure may be sampled every 60 (720/12) pips.

At 412, it may be determined if the initial fuel injection pulse width determined at 410 is sufficiently small. For example, it may be confirmed that the fuel injection pulse width is smaller than a threshold. The threshold may be based on engine speed and load, the threshold lowered as the engine speed and load increases.

If the port injection fuel pulse width is not smaller than the threshold, the routine proceeds to 428 wherein the desired PFI fuel mass is delivered according to the determined PFI fuel profile (determined at 410) by operating the high pressure fuel pump and injecting fuel via the port injector with the determined PFI fuel pulse width and timing. In other words, during conditions when the port injection fuel pulse is larger than the threshold, the method includes maintaining the port injection fuel pulse at the initial timing.

If the port injection fuel pulse width is smaller than the threshold, then at 414, the method includes calculating an initial end of injection angle for the PFI fuel pulse based on the engine operation conditions. The initial timing may be based on the velocity of the fuel travelling to the fuel rail from the HPFP, as well as a timing (or engine position) corresponding to intake valve opening. For example, the controller may calculate an initial end of injection angle for the PFI fuel pulse based on the fuel pulse width and the desired timing. In one example, the initial timing may correspond to a timing that allows for closed intake valve injection of the determined fuel mass. The initial timing may correspond to an engine position and may include a defined number of crank angle degrees. At 416, the method includes calculating a middle of injection angle for the PFI fuel pulse based on the initial end of injection angle timing and the fuel pulse width.

As such, the initial timing corresponding to closed intake valve injection may occur at any position of the waveform of the port injection fuel pressure, such as at or near a local maxima or a local minima. In other words, the initial timing may be asynchronous with the intermittent sampling of the port injection fuel rail pressure. However, such locations may result in pressure fluctuations and thereby fueling errors. As elaborated herein, the controller may be configured to adjust the delivery of the port injection fuel pulse to inject the port fuel injection with an updated timing that is balanced around, and synchronous with, a sampling point of the port injection fuel pressure. This allows fueling errors to be reduced.

Specifically, at 418, the method includes identifying a nearest sampling point of port injection fuel pressure in the advanced direction. By selecting the first sampling point in the advanced direction, closed intake valve injection of fuel can be maintained. At 420, the method includes moving delivery of the port fuel injection pulse from the initial timing, asynchronous with the intermittent sampling, and corresponding to closed intake valve injection to a final timing, synchronous with the intermittent sampling.

In one example, intermittently sampling fuel pressure in the port injection fuel rail includes a first sampling of the fuel pressure performed at a first timing followed by a second sampling of the fuel pressure at a second, later timing with no intermediate pressure sampling. A duration elapsed between the first and second timing of sampling may be based on engine firing frequency. Herein, the initial timing of the PFI fuel pulse may be based on the first sampling of fuel pressure, the initial timing after the first timing and after the second timing. In other words, the port injection fuel rail pressure may be sampled to determine an initial pulse timing. Then, the initial pulse timing may be moved (specifically, advanced) to a final timing that coincides with the second timing. The moving specifically includes aligning the middle of injection angle of the port injection fuel pulse (as determined for the initial timing) with the first average pressure crossing in the advanced direction. That is, the initial timing is advanced to align a middle angle of the port injection fuel pulse with the second timing or second sampling point. An end of injection angle of the port injection fuel pulse may then be adjusted based on the second sampling of the fuel pressure.

By advancing, and not retarding, the pulse timing, it may be ensured that each of the initial and final timing include closed intake valve injection. It will be appreciated that the port fuel injection pulse is not moved to a nearest sampling point in a retarded direction even if a distance between the initial timing and the second sampling point in the retarded direction is smaller than the distance between the initial timing and the first sampling point in the advanced direction.

At 422, the method includes adjusting intake port fuel puddle model dynamics based on the moving. In one example, due to the advancing of the timing, the adjusting may be performed to account for increased vaporization of fuel in the intake port due to a longer duration of the intake port fuel puddle sitting on the intake valve or on valve walls. In addition, the fuel pulse width may be adjusted based on the fuel pressure estimated at the second sampling point. At 424, the method includes updating the fuel pulse width and moving an end of injection angle of the port injection fuel pulse based on the aligning of the middle of injection angle and the adjusted intake port fuel puddle model dynamics. As an example, to account for the increased vaporization of fuel in the intake port, the fuel pulse width may be shortened by maintaining the middle of injection angle at the average pressure-crossing while advancing the end of injection angle. A trimming factor may be determined based on the updated fuel pulse width relative to the initial fuel pulse width (as determined at 410), and the trimming factor may be applied to the end of injection angle. Alternatively, the PFI fuel pulse width may be trimmed with a factor that is based on port injection fuel rail pressure estimated at the second, later sampling point. For example, the adjusting may include advancing the end of injection angle towards the final timing when the fuel pressure estimated at the second sampling point is smaller than the fuel pressure at the first sampling point. As another example, the adjusting may include retarding the end of injection angle away from the final timing when the fuel pressure estimated at the second sampling point is larger than the fuel pressure at the first sampling point.

The method then proceeds to 428 wherein fuel is injected or delivered via the port injector according to the updated fuel pulse timing, and updated fuel pulse width, where applicable. If direct fuel injection was also requested along with the port fuel injection, the method may further include determining the pulse width add timing of the DI fuel pulse, and also delivering fuel via the direct injector according to the determined DI fuel pulse profile.

In this way, port fueling errors induced by pressure fluctuations at the HPFP are reduced. An example delivery of fuel via port fuel injection synchronous with a fuel rail pressure sampling point is now discussed with reference to FIG. 5.

Map 500 of FIG. 5 depicts a port injection fuel rail pressure at plot 502, and a port fuel injector duty cycle (PDI_DutyCycle) at plot 520. Port injection fuel rail pressure sampling (PFI_FRP Msmt) is shown at plot 530. Specifically, plot 530 is an incrementer that is incremented each time the port injection fuel rail pressure is sampled. All plots are shown over time, depicted herein in terms of engine position in crank angle degrees (CAD) or PIPs.

As shown by the sinusoidal waveform of plot 502, the port injection fuel rail pressure may periodically fluctuate between a local maxima and a local minima. It will be appreciated that while the waveform of FIG. 5 shows symmetric waves of equal intensity and a fixed frequency, in alternate examples, the waveform may be asymmetric such that the local maxima and minima for the waveform of each cycle are different from those of another cycle.

The port injection fuel rail pressure is intermittently sampled, as indicated at plot 530. The fuel pressure at the sampling points is shown by solid circles 506*a-g*. As can be seen, the fuel rail pressure can vary significantly at each sampling point based on whether the sampling occurred at or near the local maxima of the waveform, such as at 506*a* and 506*e*, or near the local minima of the waveform, such as at 506*b*, 506*d*, and 506*f*. Since a commanded fuel pulse is based on the estimated fuel rail pressure, a fuel pulse commanded based on fuel pressure estimated near a local maxima may overestimate pulse width if the fuel pulse is delivered when the fuel pressure is near a local minima. Likewise, a fuel pulse commanded based on fuel pressure estimated near a local minima may underestimate pulse width if the fuel pulse is delivered when the fuel pressure is near a local maxima.

In the depicted example, fuel rail pressure is sampled at a first sampling point CAD1 and a first fuel pressure estimate 506*a* is obtained. Based on the fuel pressure estimation at first sampling point CAD1, a first port injection fuel pulse PW1 is determined initially for port injection of fuel in a first cylinder. First fuel pulse PW1 may have an initial pulse width w1 and an initial timing CAD3 corresponding to a position at or around a local maxima.

To reduce fueling errors induced by the sinusoidal fuel pressure change, the duty cycle of the first port injection fuel pulse PW1 is adjusted to move the timing to be balanced around a nearest sampling point, in the advanced direction relative to initial timing CAD3, herein second sampling point CAD2. Specifically, a middle of injection angle of first fuel pulse PW1 is moved from initial timing CAD3 and repositioned to be aligned with second sampling point CAD2 in the advanced direction. Thus, initial first fuel pulse PW1 (dotted line) is repositioned, as shown by arrow 510, to updated first fuel pulse PW1' (solid line). The repositioning is performed with adjustments to the fuel pulse width. Specifically, due to fuel rail pressure 506a at the first sampling point CAD1 being larger than fuel rail pressure 506b at the second sampling point CAD2, after the repositioning, updated first fuel pulse PW1' has a smaller pulse width w1' as compared to pulse width w1 of initial first fuel pulse PW1.

Fuel rail pressure is sampled again at sampling points CAD4 and CAD5. A fuel pressure estimate 506d is obtained at sampling point CAD5. Based on the fuel pressure estimation at sampling point CAD5, a second port injection fuel pulse PW2 is determined initially for port injection of fuel in a second cylinder, the second cylinder firing immediately after the first cylinder. Second fuel pulse PW2 may have an initial pulse width w2 and an initial timing CAD7 corresponding to a position at or around a local minima.

To reduce fueling errors induced by the sinusoidal fuel pressure change, the duty cycle of the second port injection fuel pulse PW2 is adjusted to move the timing to be balanced around a nearest sampling point, in the advanced direction relative to initial timing CAD7, herein sampling point CAD6. Specifically, a middle of injection angle of second fuel pulse PW2 is moved from initial timing CAD3 and repositioned to be aligned with second sampling point CAD6 in the advanced direction. Thus, initial second fuel pulse PW2 (dotted line) is repositioned, as shown by arrow 512, to updated second fuel pulse PW2' (solid line). The repositioning is performed with adjustments to the fuel pulse width. Specifically, due to fuel rail pressure 506d at the first sampling point CAD5 being smaller than fuel rail pressure 506e at the second sampling point CAD6, after the repositioning, updated second fuel pulse PW2' has a larger pulse width w2' as compared to pulse width w2 of initial second fuel pulse PW2. In this way, fuel metering from a port injection fuel rail is improved.

In one example, a method for an engine comprises: pressurizing fuel in a port injection fuel rail via an engine camshaft-driven high pressure fuel pump; intermittently sampling fuel pressure in the port injection fuel rail; and during conditions when a port injection fuel pulse is smaller than a threshold, moving the port injection fuel pulse from an initial timing, asynchronous with the intermittent sampling, to a final timing, synchronous with the intermittent sampling. In the preceding example, additionally or optionally, intermittently sampling fuel pressure in the port injection fuel rail includes a first sampling of the fuel pressure at a first timing followed by a second sampling of the fuel pressure at a second, later timing with no intermediate pressure sampling, a duration elapsed between the first and second timing based on engine firing frequency. In any or all of the preceding examples, additionally or optionally, the initial timing is based on the first sampling of fuel pressure, the initial timing after the first timing and after the second timing, and wherein the final timing coincides with the second timing. In any or all of the preceding examples, additionally or optionally, the moving includes advancing the initial timing to the second timing such that a middle angle of the port injection fuel pulse is aligned with the second timing. In any or all of the preceding examples, additionally or optionally, the method further comprises, adjusting an end of injection angle of the port injection fuel pulse based on the second sampling of the fuel pressure. In any or all of the preceding examples, additionally or optionally, the adjusting includes advancing the end of injection angle towards the final timing when the fuel pressure at the second sampling is smaller than the fuel pressure at the first sampling, and retarding the end of injection angle away from the final timing when the fuel pressure at the second sampling is larger than the fuel pressure at the first sampling. In any or all of the preceding examples, additionally or optionally, the method further comprises adjusting intake port fuel puddle model dynamics based on the moving. In any or all of the preceding examples, additionally or optionally, the method further comprises, moving an end of injection angle of the port injection fuel pulse based on the moving and the adjusted intake port fuel puddle model dynamics. In any or all of the preceding examples, additionally or optionally, the threshold is based on engine speed and load, the threshold lowered as engine speed and load increases. In any or all of the preceding examples, additionally or optionally, the method further comprises, during conditions when the port injection fuel pulse is larger than the threshold, maintaining the port injection fuel pulse at the initial timing. In any or all of the preceding examples, additionally or optionally, the method further comprises operating a port fuel injector to deliver the port injection fuel pulse at the final timing. In any or all of the preceding examples, additionally or optionally, the method further comprises pressurizing fuel in a direct injection fuel rail via the engine camshaft driven high pressure fuel pump. In any or all of the preceding examples, additionally or optionally, each of the initial and final timing include closed intake valve injection, wherein each of the initial and final timing include engine crank angle degrees.

In another example, a method for an engine comprises: measuring a port injection fuel rail pressure with a frequency, the port fuel injection rail pressurized by an engine-driven high pressure piston fuel pump; estimating an initial timing and initial width of a port injection fuel pulse based on a first measurement of the fuel rail pressure; and selectively updating each of the initial timing and the initial width of the port injection fuel pulse based on a second, immediately subsequent measurement of the fuel rail pressure. In the preceding example, additionally or optionally, the initial timing is asynchronous with the first and second measurement, and the selectively updated timing is synchronous with the second measurement. In any or all of the preceding examples, additionally or optionally, the selectively updating includes advancing the initial timing to a timing of the second measurement when the initial width of the pulse is smaller than a threshold and maintaining the initial timing when the initial width of the pulse is larger than the threshold. In any or all of the preceding examples, additionally or optionally, the selectively updating further includes, after advancing the timing, trimming the initial width of the fuel pulse based on a difference in fuel pressure between the first and second measurement. In any or all of the preceding examples, additionally or optionally, advancing the initial timing to a timing of the second measurement includes aligning a middle of injection angle of the fuel pulse with the timing of the second measurement, and wherein trimming the initial width of the fuel pulse includes advancing an end of injection angle of the fuel pulse towards the second measurement.

In another example, an engine fuel system comprises: an engine; a first fuel rail coupled to a direct injector; a second fuel rail coupled to a port injector; a high pressure mechanical fuel pump driven by the engine via a camshaft, the fuel pump delivering fuel to each of the first and second fuel rails, the first fuel rail coupled to an outlet of the high pressure fuel pump, the second fuel rail coupled to an inlet of the high pressure fuel pump; a pressure sensor coupled to the second fuel rail for estimating a fuel pressure; and a controller. The controller is configured with computer readable instructions stored on non-transitory memory for: pressurizing the port injection fuel rail via the high pressure fuel pump; performing a first sampling of the fuel pressure in the second fuel rail; calculating an initial timing and width of a port injection fuel pulse based on the first sampling; and if the width of the port injection fuel pulse is smaller than a threshold, advancing the fuel pulse from the initial timing a timing corresponding to a second sampling of the fuel pressure, the second sampling immediately following the first sampling with no further sampling in-between. The controller includes further instructions for adjusting intake port fuel puddle model dynamics based on the advancing, and adjusting the width of the fuel pulse based on the adjusted intake port fuel puddle model dynamics.

In a further representation, a method for an engine comprises: during conditions when a commanded port injection fuel pulse has a smaller than threshold pulse width, moving the fuel pulse to be balanced around a first port injection fuel rail pressure sampling point in an advanced direction; and during conditions when the commanded port injection fuel pulse has a larger than threshold pulse width, maintaining a timing of the fuel pulse.

In this way, a PFI fuel pulse center is adjusted around a sampling point of a fuel rail pressure to reduce metering errors. By aligning the middle of injection angle of the port injection fuel pulse to coincide with a first sampling point in the advanced direction, closed intake valve port fuel injection is enabled with fueling errors due to variations in fuel pressure estimation being reduced. By aligning the fuel pulse center with a position where the port injection fuel rail pressure is known more accurately, metering of fuel from the port injection fuel rail is improved. By reducing fueling errors in fuel systems where a single high pressure pump can advantageously pressurize both direct and port injection rails, component reduction benefits are achieved without incurring a loss in fueling accuracy.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
pressurizing fuel in a port injection fuel rail via an engine camshaft-driven high pressure fuel pump;
intermittently sampling fuel pressure in the port injection fuel rail; and
in response to a determination that a port-injection pulse of fuel delivered to the engine is smaller than a threshold, moving the port-injection pulse from an initial timing, asynchronous with the intermittent sampling, to a final timing, synchronous with the intermittent sampling.

2. The method of claim 1, wherein intermittently sampling fuel pressure in the port injection fuel rail includes a first sampling of the fuel pressure at a first timing followed by a second sampling of the fuel pressure at a second, later timing with no intermediate pressure sampling, a duration elapsed between the first and second timings based on engine firing frequency.

3. The method of claim 2, wherein the initial timing is based on the first sampling of fuel pressure, the initial timing is after the first timing and after the second timing, and wherein the final timing coincides with the second timing.

4. The method of claim 2, wherein the moving includes advancing the initial timing to the second timing such that a middle angle of the port-injection pulse is aligned with the second timing.

5. The method of claim 4, further comprising adjusting an end of injection angle of the port-injection pulse based on the second sampling of the fuel pressure.

6. The method of claim 5, wherein the adjusting includes advancing the end of injection angle towards the final timing when the fuel pressure at the second sampling is smaller than the fuel pressure at the first sampling, and retarding the end of injection angle away from the final timing when the fuel pressure at the second sampling is larger than the fuel pressure at the first sampling.

7. The method of claim 1, further comprising adjusting intake port fuel puddle model dynamics based on the moving.

8. The method of claim 7, further comprising moving an end of injection angle of the port-injection pulse based on the moving and the adjusted intake port fuel puddle model dynamics.

9. The method of claim 1, wherein the threshold is based on engine speed and load, the threshold lowered as engine speed and load increases.

10. The method of claim 1, further comprising, in response to a determination that the port-injection pulse is larger than the threshold, maintaining the port-injection pulse at the initial timing.

11. The method of claim 1, further comprising operating a port fuel injector to deliver the port-injection pulse at the final timing.

12. The method of claim 1, further comprising pressurizing fuel in a direct injection fuel rail via the engine camshaft-driven high pressure fuel pump.

13. The method of claim 1, wherein each of the initial and final timings includes closed intake valve injection, and wherein each of the initial and final timings includes engine crank angle degrees.

14. A method for an engine, comprising:
measuring a port injection fuel rail pressure with a frequency, the port injection fuel rail pressurized by an engine-driven high pressure piston fuel pump;
estimating an initial timing and an initial width of a port-injection pulse of fuel injected into the engine based on a first measurement of the port injection fuel rail pressure; and
selectively updating each of the initial timing and the initial width of the port-injection pulse based on a second, immediately subsequent measurement of the port injection fuel rail pressure, the initial timing asynchronous with the first and second measurements, the selectively updated timing synchronous with the second measurement.

15. The method of claim 14, wherein the selectively updating includes advancing the initial timing to a timing of the second measurement when the initial width of the port-injection pulse is smaller than a threshold and maintaining the initial timing when the initial width of the port-injection pulse is larger than the threshold.

16. The method of claim 15, wherein the selectively updating further includes, after advancing the initial timing, trimming the initial width of the port-injection pulse based on a difference in fuel pressure between the first and second measurements.

17. The method of claim 16, wherein advancing the initial timing to the timing of the second measurement includes aligning a middle of injection angle of the port-injection pulse with the timing of the second measurement, and wherein trimming the initial width of the port-injection pulse includes advancing an end of injection angle of the port-injection pulse towards the second measurement.

18. An engine fuel system, comprising:
an engine;
a first fuel rail coupled to a direct injector;
a second fuel rail coupled to a port injector;
a high pressure mechanical fuel pump driven by the engine via a camshaft, the fuel pump delivering fuel to each of the first and second fuel rails, the first fuel rail coupled to an outlet of the high pressure mechanical fuel pump, the second fuel rail coupled to an inlet of the high pressure mechanical fuel pump;
a pressure sensor coupled to the second fuel rail for estimating a fuel pressure; and
a controller with computer readable instructions stored on non-transitory memory configured to:
pressurize the second fuel rail via the high pressure mechanical fuel pump;
perform a first sampling of the fuel pressure in the second fuel rail;
calculate an initial timing and width of a port-injection pulse based on the first sampling; and
if the width of the port-injection pulse is smaller than a threshold,
advance the port-injection pulse from the initial timing to a timing corresponding to a second sampling of the fuel pressure, the second sampling immediately following the first sampling with no further sampling in-between.

19. The system of claim 18, wherein the controller includes further instructions configured to adjust intake port fuel puddle model dynamics based on the advancing, and adjust the width of the port-injection pulse based on the adjusted intake port fuel puddle model dynamics.

* * * * *